(12) United States Patent
Graham

(10) Patent No.: US 6,793,141 B1
(45) Date of Patent: Sep. 21, 2004

(54) CREDIT CARD

(76) Inventor: R. William Graham, P.O. Box 332, Dayton, OH (US) 45401

( * ) Notice: Subject to any disclaimer, the term of this patent is extended or adjusted under 35 U.S.C. 154(b) by 126 days.

(21) Appl. No.: 10/201,438

(22) Filed: Jul. 23, 2002

(51) Int. Cl.[7] .............................................. G06K 19/00
(52) U.S. Cl. ........................ 235/487; 235/493; 235/449
(58) Field of Search ................................. 235/487, 493, 235/449

(56) References Cited

U.S. PATENT DOCUMENTS 5,844,230 A * 12/1998 Lalonde ...................... 235/487
5,883,377 A * 3/1999 Chapin, Jr. .................. 235/493
5,984,191 A * 11/1999 Chapin, Jr. .................. 235/493
6,588,658 B1 * 7/2003 Blank .......................... 235/380

* cited by examiner

Primary Examiner—Michael G. Lee
Assistant Examiner—Kimberly D. Nguyen
(74) Attorney, Agent, or Firm—R. William Graham

(57) ABSTRACT

A credit card which includes a generally planar member which is configured occupy approximately one half of a predetermined space for a conventional credit card which is 2.125 (H)×3.375 (L) inches. The card is further characterized to enable mating with a substantially identically geometrically formed card such that when so mated the two cards substantially occupy the predetermined space of a conventional credit card.

6 Claims, 2 Drawing Sheets

CREDIT CARD

BACKGROUND OF THE INVENTION

1. Field of the Invention

The present invention relates to a credit card.

2. Related Art

The traditional credit card is of a rectangular configuration of a size approximately 2.125×3.375 inches and rectangular in shape. Credit cards related to financial transactions have a magnetic stripe which runs longitudinally across the face of one side and have a plurality of numbers (card number), expiration date and a name embossed thereon. Further, the credit card includes an issuing company's identification thereon, such as Visa® or American Express®

While the manufacturing of such cards is governed by various international standards and banking industries, there remains a need to improve the design of such cards from both a consumer as well as card manufacturer standards while still meeting the guidelines of the current standards.

BRIEF SUMMARY OF THE INVENTION

It is an object to improve credit cards.

It is an object to provide a user friendly credit card design.

Accordingly, the present invention is directed to a novel credit card for use in conventional credit card equipment. The credit card includes a generally planar member which is configured occupy approximately one half of a predetermined space for a conventional credit card which is 2.125 (H)×3.375 (L) inches. The credit card is made of plastic.

Other objects and advantages will be readily apparent to those skilled in the art upon viewing the drawings and reading the detailed description hereafter.

DETAILED DESCRIPTION OF THE INVENTION

Figure 1:
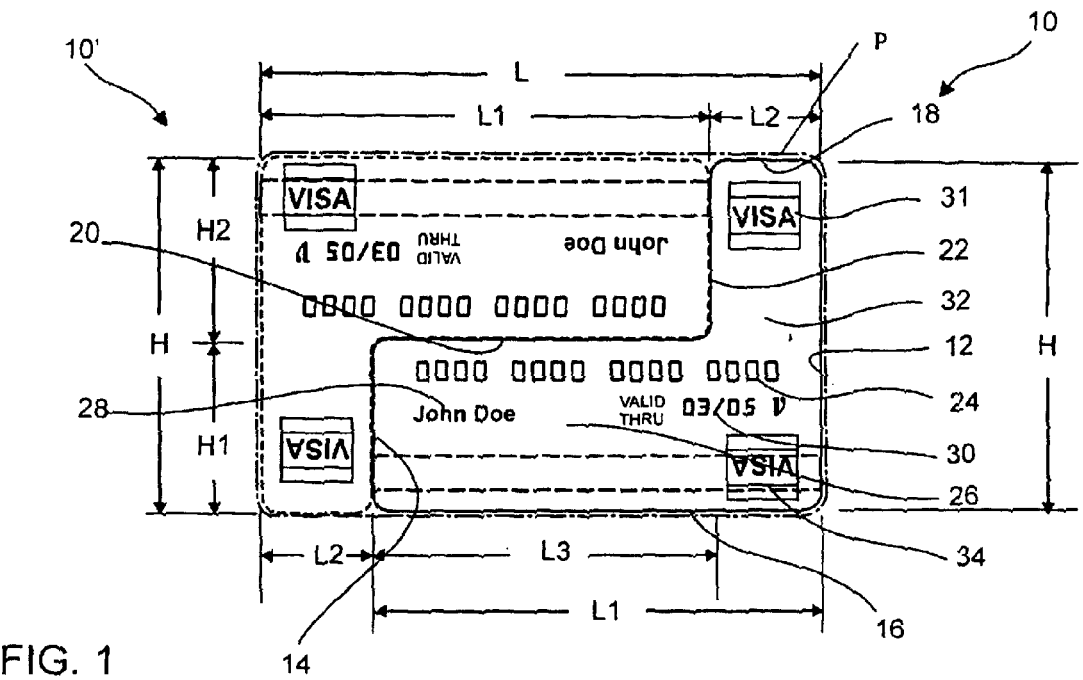
FIG. 1 is a plan view of one embodiment of the present invention.
Figure 2:
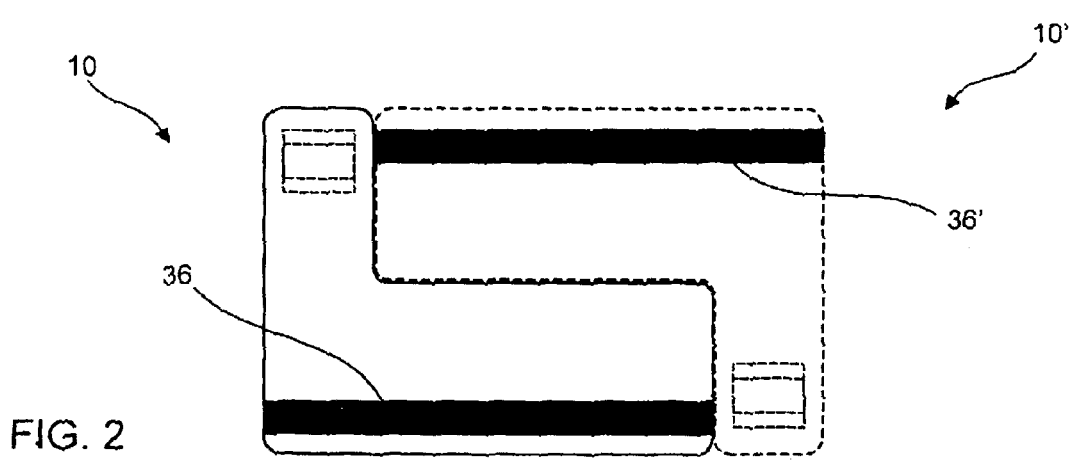
FIG. 2 is a plan view of a back of the embodiment in FIG. 1.

Referring now to the drawings, the credit card of the present invention is generally depicted by the numerals 10, 100, 1000 and 10000. For sake of brevity, the embodiment depicting credit card 10 will be fully described with the embodiments 100, 1000 and 10000 to include like elements unless otherwise discussed.

The credit cards 10, 100, 1000 and 10000 are unique in their design. The credit cards 10, 100, 1000 and 10000 are so geometrically configured such that two like configured cards can mate with one another to substantially form the rectangular configuration of a size approximately 2.125 (H)×3.375 (L) inches which is identified as a peripheral area P, which in turn is generally the dimension of a conventional credit card size. Peripheral area P is shown in the drawings as slightly larger than its true dimension to aid in illustrating the invention. Thus, the credit cards 10, 100, 1000 and 10000 are configured to occupy approximately one half of the peripheral area P. The card 10 has one end 12 which is formed with of a height H which is substantially that of the height H of a typical credit card while its other end 14 is of a lesser height H1. One side 16 is of a length L1 which is shorter than length L dimension of a typical credit card. Opposing side 16 are sides 18 and 20. Sides 18 and 20 run generally parallel to side 16 and are interconnected by side 22 which is runs generally perpendicular thereto. Note, side 18 is of a length L2 and side 20 of a length L3 which collectively substantially equate to length L1 of side 16.

Thus, the configuration of the card 10 is shown here as generally L shaped. A symmetrical portion 10' represents a like credit card of that of card 10 in an inverted position which when mated as shown together substantially occupy the area formed by peripheral region P.

The credit card 10 includes an embossed series of numbers 24 formed on a larger portion 26 of the card 10. The numbers 24 are typically of a standardized size and length to comply with current industry standards and thus are formed on the portion 26 and length L1 must be sufficient to accommodate this requirement. Also, the card holder's name 28, and expiration date 30 appear on the card 10 and are also oriented to comply with industry standards.

A card logo 31, such as Visa® can be provided on the face of the card 10 and is shown here on a smaller portion 32. Also, another logo 34 can be provided, here optionally shown in an inverted manner, on the larger portion 26. In this way, when the cards 10 and 10' are mated as in the case when inserted into a wallet, the card holder can readily view the card type by the logos 31.

On a back side of the card 10 is a magnetic stripe 36 having the required credit card holder's information stored thereon. The magnetic 36 spans a predetermined length in order to comply with industry standards and be able to be suitably read by industry standard credit card machines. It is important to note that the magnetic stripe 36 is operatively disposed on the card 10 in a way which is not encumbered by the embossed numbers 24, name 28 and expiration date 30.

Figure 3:
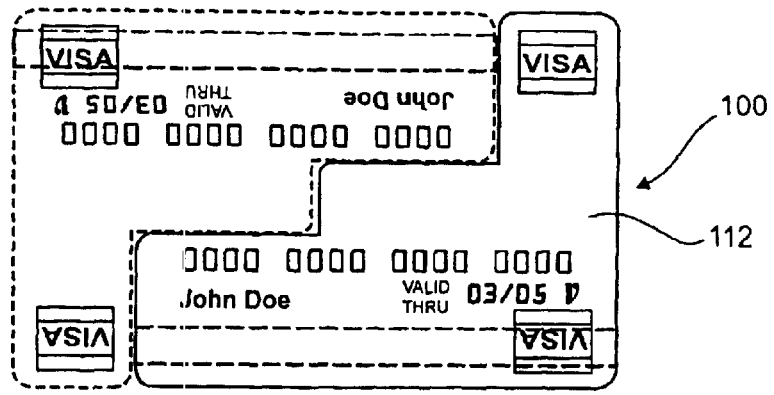
FIG. 3 is a plan view of another embodiment of the present invention.
Figure 4:
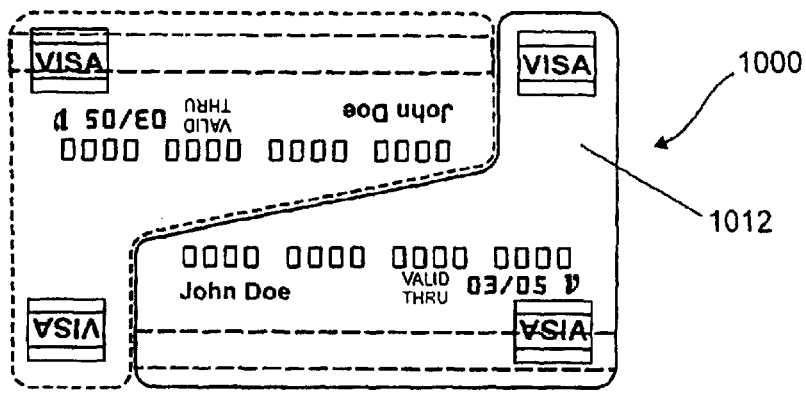
FIG. 4 is a plan view of still embodiment of the present invention.
Figure 5:
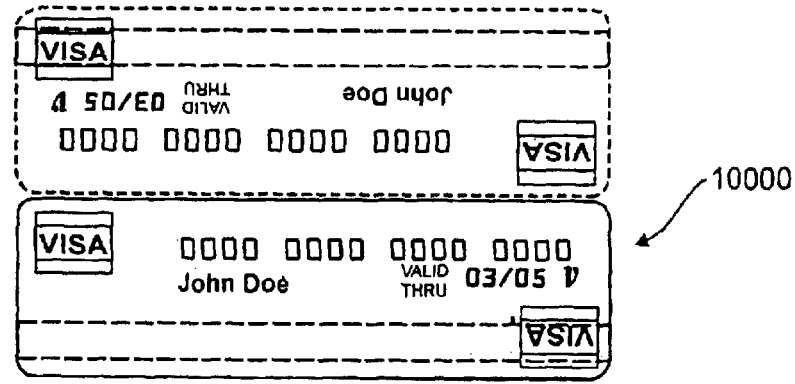
FIG. 5 is yet another embodiment.

FIGS. 3–5 reveal variations of the present invention with the function to maximize credit card holding space in a card holder's wallet remaining essentially the same. FIG. 3 depicts a card 100 having a stair-step shape whereas FIG. 4 reveals a tapered L shaped card 1000.

FIGS. 1–4 depict embodiments which are not rectangular in shape and can have advantage in enabling a user to better grasp smaller end 12, 112, or 1012 while swiping the magnetic stripe 36. FIG. 5 discloses an embodiment which may also be employed as a rectangular configuration with an advantage of retaining existing length of the magnetic stripe 36.

It is contemplated that a blank card, in other words, a card plate of like geometry, may be used to aid the manufacture and use of the present invention in and with conventional card manufacturing and charge equipment. Also, the blank card can be employed as part of a positioning or alignment piece for manufacturing, embossing new cards.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A credit card for use in a conventional plastic credit card device which is configured for a conventional credit card having a substantially rectangular configuration of a peripheral area P of approximately 2.125 inches height H by 3.375 inches length L, and having four generally rounded corners, two opposing sides of approximately 2.125 inch height H and two opposing sides of approximately 3.375 inches length L, the sides interconnecting the four corners and adjacent sides being disposed at approximately ninety degrees from one another and the card having a name, a credit card number and an expiration date embossed thereon and a magnetic stripe operably disposed on one side thereof, which comprises:

a plastic card which is geometrically configured to occupy approximately one half of the peripheral area P, said card having a first corner and a first side and a second side connected to said first corner at approximately ninety degrees to one another, wherein said first side is of a first height and said second side is of a first length, wherein at least one of said first height and said first length is less than the height H and length L, respectively, of the peripheral area P, and further has at least a second corner, a third corner and a fourth corner and at least a third side and a fourth side in which said first side connects said first corner and one of directly and indirectly said fourth corner, said second side connects said first corner and said second corner, said third side connects said second corner and said third corner and said fourth side connects said fourth corner and said third corner, a card holder name, a credit card number, an expiration date, and a magnetic stripe operably formed on said card, and wherein said card is further characterized to enable mating thereof with a separate and independent substantially identically geometrically formed card such that when so mated said two cards substantially occupy the peripheral area P, wherein the credit card further includes a fifth corner, a sixth corner, a fifth side and a sixth side, said fifth side connects said fourth corner and said fifth corner, said sixth side connects said fifth corner and said sixth corner and said first side connects said first corner and said sixth corner, wherein said card is L-shaped.

2. A credit card for use in a conventional plastic credit card device which is configured for a conventional credit card having a substantially rectangular configuration of a peripheral area P of approximately 2.125 inches height H by 3.375 inches length L, and having four generally rounded corners, two opposing sides of approximately 2.125 inch height H and two opposing sides of approximately 3.375 inches length L, the sides interconnecting the four corners and adjacent sides being disposed at approximately ninety degrees from one another and the card having a name, a credit card number and an expiration date embossed thereon and a magnetic stripe operably disposed on one side thereof, which comprises:

a plastic card which is geometrically configured to occupy approximately one half of the peripheral area P, said card having a first corner and a first side and a second side connected to said first corner at approximately ninety degrees to one another, wherein said first side is of a first height and said second side is of a first length, wherein at least one of said first height and said first length is less than the height H and length L, respectively, of the peripheral area P, and further has at least a second corner, a third corner and a fourth corner and at least a third side and a fourth side in which said first side connects said first corner and one of directly and indirectly said fourth corner, said second side connects said first corner and said second corner, said third side connects said second corner and said third corner and said fourth side connects said fourth corner and said third corner, a card holder name, a credit card number, an expiration date, and a magnetic stripe operably formed on said card, and wherein said card is further characterized to enable mating thereof with a separate and independent substantially identically geometrically formed card such that when so mated said two cards substantially occupy the peripheral area P, wherein the credit card further includes a fifth corner, a sixth corner, a fifth side and a sixth side, said fifth side connects said fourth corner and said fifth corner, said sixth side connects said fifth corner and said sixth corner and said first side connects said first corner and said sixth corner, wherein said card includes a tapered L-shape.

3. A credit card for use in a conventional plastic credit card device which is configured for a conventional credit card having a substantially rectangular configuration of a peripheral area P of approximately 2.125 inches height H by 3.375 inches length L, and having four generally rounded corners, two opposing sides of approximately 2.125 inch height H and two opposing sides of approximately 3.375 inches length L, the sides interconnecting the four corners and adjacent sides being disposed at approximately ninety degrees from one another and the card having a name, a credit card number and an expiration date embossed thereon and a magnetic stripe operably disposed on one side thereof, which comprises:

a plastic card which is geometrically configured to occupy approximately one half of the peripheral area P, said card having a first corner and a first side and a second side connected to said first corner at approximately ninety degrees to one another, wherein said first side is of a first height and said second side is of a first length, wherein at least one of said first height and said first length is less than the height H and length L, respectively, of the peripheral area P, and further has at least a second corner, a third corner and a fourth corner and at least a third side and a fourth side in which said first side connects said first corner and one of directly and indirectly said fourth corner, said second side connects said first corner and said second corner, said third side connects said second corner and said third corner and said fourth side connects said fourth corner and said third corner, a card holder name, a credit card number, an expiration date, and a magnetic stripe operably formed on said card, and wherein said card is further characterized to enable mating thereof with a separate and independent substantially identically geometrically formed card such that when so mated said two cards substantially occupy the peripheral area P, wherein the credit card further includes a fifth corner, a sixth corner, a seventh corner, and eighth corner, a fifth side, a sixth side, a seventh side and an eighth side, said fifth side connects said fourth corner and said fifth corner, said sixth side connects said fifth corner and said sixth corner, said seventh side connects said sixth corner and said seventh corner, said eighth side connects said seventh corner and said eighth corner, said first side connects said eighth corner and said first corner, wherein said card includes a stair step shape.

4. A method of forming credit card in a conventional plastic credit card device having a plate which is configured for receiving a conventional credit card manufacturing plate having a substantially rectangular configuration of a peripheral area P of approximately 2.125 inches height H by 3.375 inches length L, and having four generally rounded corners, two opposing sides of approximately 2.125 inch height H and two opposing sides of approximately 3.375 inches length L, the sides interconnecting the four corners and adjacent sides being disposed at approximately ninety degrees from one another and the card having a name, a credit card number and an expiration date embossed thereon and a magnetic stripe operably disposed on one side thereof, which comprises:

disposing a blank in the credit card manufacturing plate to hold a plastic card which is geometrically configured to occupy approximately one half of the peripheral area P, said card having a first corner and a first side and a second side connected to said first corner at approximately ninety degrees to one another, wherein said first side is of a first height and said second side is of a first length, wherein at least one of said first height and said first length is less than the height H and length L, respectively, of the peripheral area P, and further has at least a second corner, a third corner and a fourth corner and at least a third side and a fourth side in which said second side connects said first corner and said second corner, said third side connects said second corner and said third corner and said fourth side one of directly and indirectly connects said fourth corner and said first corner, a magnetic stripe operably formed on one side of said card; and forming at least one of a card holder name, a credit card number and an expiration date on said card; and wherein said formed card is further characterized to enable mating thereof with a separate and independent substantially identically geometrically formed card such that when so mated said two cards substantially occupy the peripheral area P;

wherein said credit card further includes a fifth corner, a sixth corner, a fifth side and a sixth side, said fifth side connects said fourth corner and said fifth corner, said sixth side connects said fifth corner and said sixth corner and said first side connects said first corner and said sixth corner and is L-shaped.

5. A method of forming credit card in a conventional plastic credit card device having a plate which is configured for receiving a conventional credit card manufacturing plate having a substantially rectangular configuration of a peripheral area P of approximately 2.125 inches height H by 3.375 inches length L, and having four generally rounded corners, two opposing sides of approximately 2.125 inch height H and two opposing sides of approximately 3.375 inches length L, the sides interconnecting the four corners and adjacent sides being disposed at approximately ninety degrees from one another and the card having a name, a credit card number and an expiration date embossed thereon and a magnetic stripe operably disposed on one side thereof, which comprises:

disposing a blank in the credit card manufacturing plate to hold a plastic card which is geometrically configured to occupy approximately one half of the peripheral area P, said card having a first corner and a first side and a second side connected to said first corner at approximately ninety degrees to one another, wherein said first side is of a first height and said second side is of a first length, wherein at least one of said first height and said first length is less than the height H and length L, respectively, of the peripheral area P, and further has at least a second corner, a third corner and a fourth corner and at least a third side and a fourth side in which said second side connects said first corner and said second corner, said third side connects said second corner and said third corner and said fourth side one of directly and indirectly connects said fourth corner and said first corner, a magnetic stripe operably formed on one side of said card; and forming at least one of a card holder name, a credit card number and an expiration date on said card; and wherein said formed card is further characterized to enable mating thereof with a separate and independent substantially identically geometrically formed card such that when so mated said two cards substantially occupy the peripheral area P;

wherein said card further includes a fifth corner, a sixth corner, a fifth side and a sixth side, said fifth side connects said fourth corner and said fifth corner, said sixth side connects said fifth corner and said sixth corner and said first side connects said first corner and said sixth corner and includes a tapered L-shape.

6. A method of forming credit card in a conventional plastic credit card device having a plate which is configured for receiving a conventional credit card manufacturing plate having a substantially rectangular configuration of a peripheral area P of approximately 2.125 inches height H by 3.375 inches length L, and having four generally rounded corners, two opposing sides of approximately 2.125 inch height H and two opposing sides of approximately 3.375 inches length L, the sides interconnecting the four corners and adjacent sides being disposed at approximately ninety degrees from one another and the card having a name, a credit card number and an expiration date embossed thereon and a magnetic stripe operably disposed on one side thereof, which comprises:

disposing a blank in the credit card manufacturing plate to hold a plastic card which is geometrically configured to occupy approximately one half of the peripheral area P, said card having a first corner and a first side and a second side connected to said first corner at approximately ninety degrees to one another, wherein said first side is of a first height and said second side is of a first length, wherein at least one of said first height and said first length is less than the height H and length L, respectively, of the peripheral area P, and further has at least a second corner, a third corner and a fourth corner and at least a third side and a fourth side in which said second side connects said first corner and said second corner, said third side connects said second corner and said third corner and said fourth side one of directly and indirectly connects said fourth corner and said first corner, a magnetic stripe operably formed on one side of said card; and forming at least one of a card holder name, a credit card number and an expiration date on said card; and wherein said formed card is further characterized to enable mating thereof with a separate and independent substantially identically geometrically formed card such that when so mated said two cards substantially occupy the peripheral area P;

wherein said card further includes a fifth corner, a sixth corner, a seventh corner, and eighth corner, a fifth side, a sixth side, a seventh side and an eighth side, said fifth side connects said fourth corner and said fifth corner, said sixth side connects said fifth corner and said sixth corner, said seventh side connects said sixth corner and said seventh corner, said eighth side connects said seventh corner and said eighth corner, said first side connects said eighth corner and said first corner and includes a stair step shape.

* * * * *